United States Patent
Gurvich et al.

(10) Patent No.: US 10,587,651 B2
(45) Date of Patent: Mar. 10, 2020

(54) PROTECTION OF CLOUD-PROVIDER SYSTEM USING SCATTERED HONEYPOTS

(71) Applicant: Guardicore Ltd., Tel Aviv (IL)

(72) Inventors: Pavel Gurvich, Tel Aviv (IL); Ofri Ziv, Herzliya (IL); Yoni Rozenshein, Ramat Gan (IL)

(73) Assignee: Guardicore Ltd., Tel Aviv (IL)

( * ) Notice: Subject to any disclaimer, the term of this patent is extended or adjusted under 35 U.S.C. 154(b) by 338 days.

(21) Appl. No.: 15/591,240

(22) Filed: May 10, 2017

(65) Prior Publication Data

US 2017/0339186 A1    Nov. 23, 2017

Related U.S. Application Data

(60) Provisional application No. 62/339,896, filed on May 22, 2016.

(51) Int. Cl.
*H04L 29/06* (2006.01)
*H04L 29/08* (2006.01)
*H04L 29/12* (2006.01)

(52) U.S. Cl.
CPC ...... *H04L 63/1491* (2013.01); *H04L 61/2038* (2013.01); *H04L 63/1408* (2013.01); *H04L 67/1097* (2013.01)

(58) Field of Classification Search
CPC ............. H04L 63/1408; H04L 63/1425; H04L 63/1433; H04L 63/1491
See application file for complete search history.

(56) References Cited

U.S. PATENT DOCUMENTS

| | | | |
|---|---|---|---|
| 9,491,189 B2 | 11/2016 | Zeitlin et al. | |
| 9,716,727 B1* | 7/2017 | Seger | H04L 63/1491 |
| 2016/0218991 A1* | 7/2016 | Sharabi | G06F 9/45558 |
| 2017/0111391 A1* | 4/2017 | Chao | H04L 63/1491 |
| 2018/0063191 A1* | 3/2018 | Woronka | G06F 9/45558 |

OTHER PUBLICATIONS

Ester et al., "A density-based algorithm for discovering clusters in large spatial databases with noise", Kdd-96 Proceedings, vol. 96, No. 34, pp. 226-231, 1996.
Rozenshein et al., U.S. Appl. No. 15/492,009, filed Apr. 20, 2017.

\* cited by examiner

*Primary Examiner* — Minh Dinh
(74) *Attorney, Agent, or Firm* — Kliger & Associates Patent Attorneys Ltd

(57) ABSTRACT

An apparatus for securing a cloud-provider system includes one or more network interfaces and one or more processors. The network interfaces are configured for connecting to a network. The processors are configured to allocate resources of the cloud-provider system for use by tenants of the cloud-provider system, to allocate to the tenants one or more Internet Protocol (IP) address ranges, to assign multiple IP addresses, scattered across the IP address ranges, for use by one or more honeypot servers, and to secure the cloud-provider system against hostile attacks, by processing network traffic associated with the assigned IP addresses using at least the honeypot servers.

16 Claims, 2 Drawing Sheets

PROTECTION OF CLOUD-PROVIDER SYSTEM USING SCATTERED HONEYPOTS

CROSS-REFERENCE TO RELATED APPLICATIONS

This application claims the benefit of U.S. Provisional Patent Application 62/339,896, filed May 22, 2016, whose disclosure is incorporated herein by reference.

FIELD OF THE INVENTION

The present invention relates generally to computer network security, and particularly to methods and systems for protecting cloud-provider systems.

BACKGROUND OF THE INVENTION

Cloud providers typically operate computer systems comprising large numbers of servers. The resources of such systems are provided to clients, also referred to as tenants. In a typical deployment, the cloud-provider system hosts a large number of Virtual Machines (VMs) belonging to multiple tenants. The VMs and the cloud-provider system as a whole are often subject to various security threats.

SUMMARY OF THE INVENTION

An embodiment of the present invention that is described herein provides an apparatus for securing a cloud-provider system. The apparatus includes one or more network interfaces and one or more processors. The network interfaces are configured for connecting to a network. The processors are configured to allocate resources of the cloud-provider system for use by tenants of the cloud-provider system, to allocate to the tenants one or more Internet Protocol (IP) address ranges, to assign multiple IP addresses, scattered across the IP address ranges, for use by one or more honeypot servers, and to secure the cloud-provider system against hostile attacks, by processing network traffic associated with the assigned IP addresses using at least the honeypot servers.

In an embodiment, each of the IP address ranges includes a respective IP subnet. In another embodiment, the one or more processors are configured to secure the cloud-provider system without accessing the resources allocated to the tenants.

In some embodiments, the one or more processors are configured to (i) extract one or more attack parameters from the network traffic associated with the assigned IP addresses, (ii) specify a rule based on the extracted parameters, and (iii) apply the rule to other network traffic, which is associated with other IP addresses in the IP address ranges, different from the assigned IP addresses. In a disclosed embodiment, the rule includes a blocking rule specifying network traffic to be blocked, or a reporting rule specifying an attack to be reported.

In another embodiment, the one or more processors are configured to extract attack parameters from the network traffic associated with the assigned IP addresses, to cluster detected attacks to one or more groups, and to secure the cloud-provider system responsively to the groups.

There is additionally provided, in accordance with an embodiment of the present invention, a method for securing a cloud-provider system. The method includes allocating resources of the cloud-provider system for use by tenants of the cloud-provider system, and further allocating to the tenants one or more Internet Protocol (IP) address ranges. Multiple IP addresses, scattered across the IP address ranges, are assigned for use by one or more honeypot servers. The cloud-provider system is secured against hostile attacks, by processing network traffic associated with the assigned IP addresses using at least the honeypot servers.

The present invention will be more fully understood from the following detailed description of the embodiments thereof, taken together with the drawings in which:

DETAILED DESCRIPTION OF EMBODIMENTS

Overview

Figure 1:
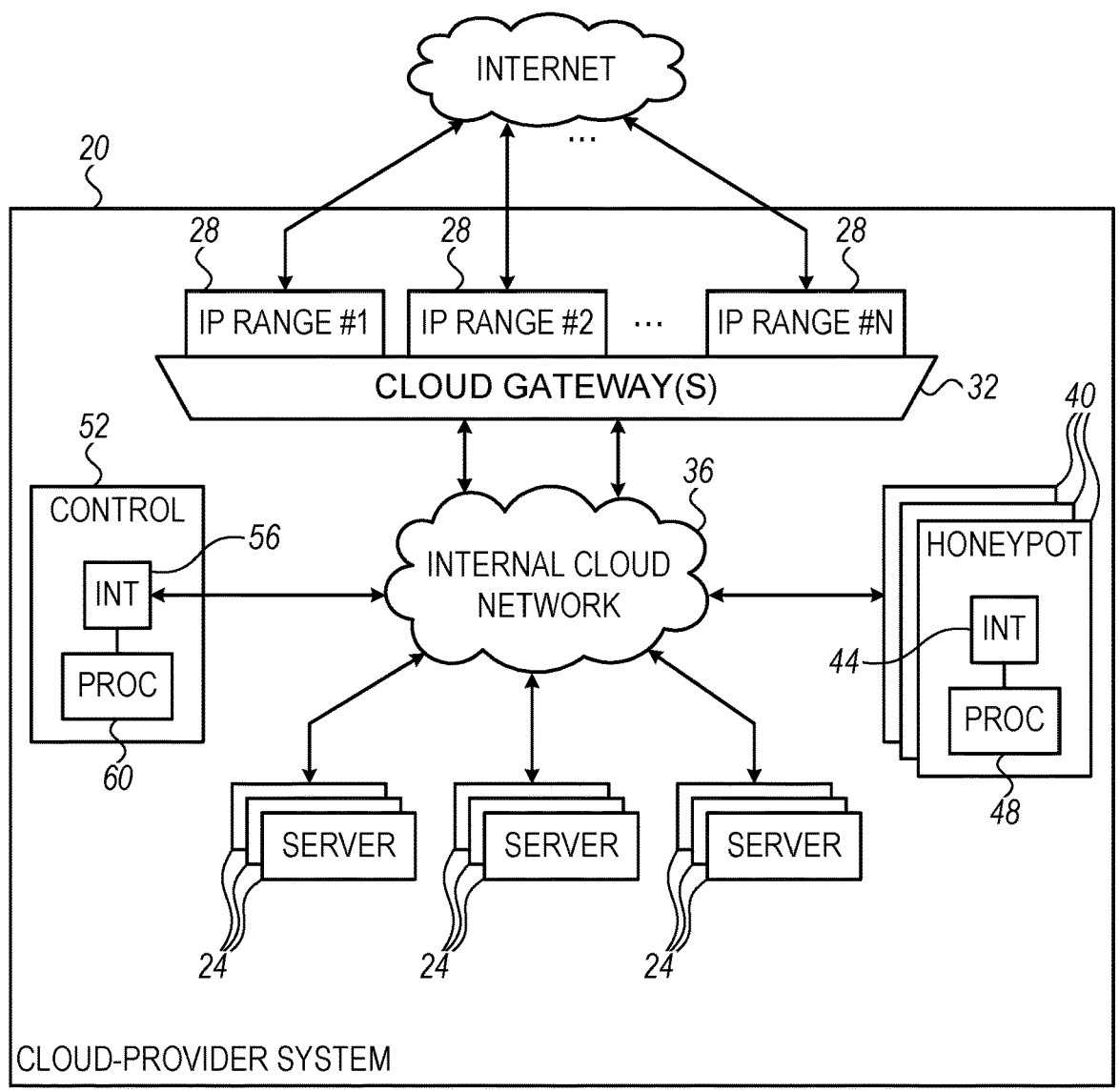
FIG. 1 is a block diagram that schematically illustrates a secure cloud-provider system, in accordance with an embodiment of the present invention.

Embodiments of the present invention that are described herein provide methods and apparatus for securing cloud-provider systems against hostile attacks. In some embodiments, a cloud-provider system comprises multiple servers whose resources are allocated to the cloud provider's tenants. In addition, the cloud provider owns, and allocates to the tenants, ranges of Internet Protocol (IP) addresses. The tenants may run any suitable applications and implement any suitable business logic using their allocated server resources and IP address ranges.

Since the cloud-provider system is connected to the Internet, it is exposed to hostile attacks and security threats in general. In practice, the use-case of a cloud-provider system is highly challenging from a network security perspective. On one hand, each tenant is typically responsible to secure the servers it uses and the applications it runs. The cloud provider has no control over, or access to, security measures that may or may not be deployed by the tenants. On the other hand, security breaches in the cloud-provider system reflect badly on the cloud provider, and may have consequences that are beyond the scope of any individual tenant.

In some embodiments of the present invention, the cloud provider deploys its own layer of security for identifying, analyzing, reporting and/or mitigating security attacks on the cloud-provider system. In these embodiments, the cloud-provider system further comprises one or more honeypot servers ("honeypots"). The cloud provider assigns to the honeypots a plurality of IP addresses ("honeypot addresses"), scattered across the IP address ranges allocated to the tenants. The number of honeypot addresses may be considerably larger than the number of honeypot servers, e.g., by directing traffic of multiple honeypot addresses to the same honeypot, thereby saving computing resources.

Each honeypot detects and analyzes incoming attacks on its assigned honeypot addresses. The analysis may involve extraction of various attack parameters, referred to as Indicators of Compromise (IOCs). The IOCs may be used for blocking attacks in real-time, and/or for reporting and off-line investigation. In some embodiments, the multitude of attacks detected by the honeypots are classified ("clustered") to a relatively small number of groups having similar characteristics. Clustering of the attacks provides valuable insights and information for subsequent investigation and research.

The disclosed techniques exploit the fact that, in many practical scenarios, nearby IP addresses (e.g., addresses in the same subnet) are subject to similar attacks. By distributing the honeypot addresses across the IP address ranges allocated to the tenants, the disclosed techniques are able to detect and analyze attacks on these IP address ranges effectively, even without any access to the tenants' applications. When possible, however, additional information provided by the tenants' own security applications may complement the disclosed techniques, to further improve the cloud provider system security.

System Description

FIG. 1 is a block diagram that schematically illustrates a secure cloud-provider system 20, in accordance with an embodiment of the present invention. System 20 is operated by a cloud service provider, which provides cloud computing resources to one or more tenants.

In the present example, system 20 comprises a large number of servers 24 whose resources are provided to tenants. Resources may comprise, for example, computing (CPU), memory, storage and networking resources. Thus, servers 24 typically comprise suitable CPUs, volatile memories, storage devices and network interfaces (not shown in the figure).

Tenants may use their allocated resources for running any suitable applications. For example, a tenant may run a plurality of Virtual Machines (VMs) that carry out some suitable application. Example applications may comprise enterprise data centers, e-commerce sites and many others.

The cloud provider typically owns one or more ranges 28 of Internet Protocol (IP) addresses, which are also provided to the tenants for use together with their allocated server resources. In the embodiment of FIG. 1 system 20 allocates to its tenants N contiguous IP address ranges 28, e.g., IP subnets, not necessarily of the same size.

In the present example, system 20 is connected to the Internet via one or more cloud gateways 32. An internal communication network 36, e.g., a suitable Local-Area Network (LAN), connects servers 24 and gateways 32. Network traffic between servers 24 and the Internet traverses network 36 and gateways 32.

Typically, the ranges of IP addresses that are owned and assigned by the cloud provider are external IP address, i.e., as they appear on the Internet. Gateways 32 thus translate between these external IP addresses (and ports) and internal IP addresses (of the tenants and honeypot servers).

Servers 24 are thus connected to the Internet, and typically communicate over the Internet with computers external to system 20 as part of their normal operation. As such, servers 24 are exposed to hostile attacks and security threats.

In some embodiments, system 20 further comprises one or more honeypot servers 40, which identify, analyze and report attacks on system 20 using methods that are described in detail below. Honeypot servers 40 are referred to herein simply as "honeypots" for brevity. Each honeypot comprises a network interface 44, e.g., a Network Interface Controller (NIC), for connecting to network 36, and a processor 48 that carries out the various honeypot functions.

Additionally, system 20 comprises a control server 52 that configures, controls and manages the operation of system 20. Control server 52 comprises a network interface 56, e.g., a NIC, for connecting to network 36, and a processor 60 that carries out the various functions of control server 52. Some of the functions of control server 52 are related to security, as will be described in detail below.

The configuration of system 20 shown in FIG. 1 is an example configuration that is depicted purely for the sake of conceptual clarity. In alternative embodiments, any other suitable system configuration can be used. Each system element, e.g., each server 24, gateway 32, honeypot 40 and control server 52, may comprise any suitable type of computer.

In some embodiments, one or more of servers 24, gateways 32, honeypots 40 and control server 52, or even all these elements, comprise physical hardware-implemented machines. In other embodiments, one or more of servers 24, gateways 32, honeypots 40 and control server 52, or even all these elements, comprise virtual machines.

In some embodiments, certain system elements shown in FIG. 1 may be implemented using suitable hardware, such as in an Application-Specific Integrated Circuit (ASIC) or Field-Programmable Gate Array (FPGA). Alternatively, certain system elements can be implemented using software, or using a combination of hardware and software elements.

Typically, processors 48 of honeypots 40 and processor 60 of control server 52 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Securing a Cloud-Provider Network Using Scattered Honeypots

In a typical embodiment, the cloud provider (e.g., via control server 52) has no access to or control over the applications run by the tenants. In particular, each tenant is typically responsible to secure its allocated servers 24 and the applications it runs on them. Some tenants may choose to deploy security applications, such as firewalls, Intrusion Detection Systems (IDSs) or anti-virus tools. The cloud provider, however, typically has no control over the quality of these measures, if at all deployed.

Notwithstanding this lack of access and control, in practice the cloud provider has a strong incentive to increase the level of security of system 20. For example, successful attacks on tenant applications will inevitable reflect badly on the cloud provider. Moreover, some attacks may affect system 20 as a whole, not merely applications of individual tenants. Thus, in some embodiments control server 52 and honeypots 40 implement a security layer that detects, analyzes, reports and/or blocks attacks, without a need to access the tenant applications or servers 24 in general.

Figure 2:
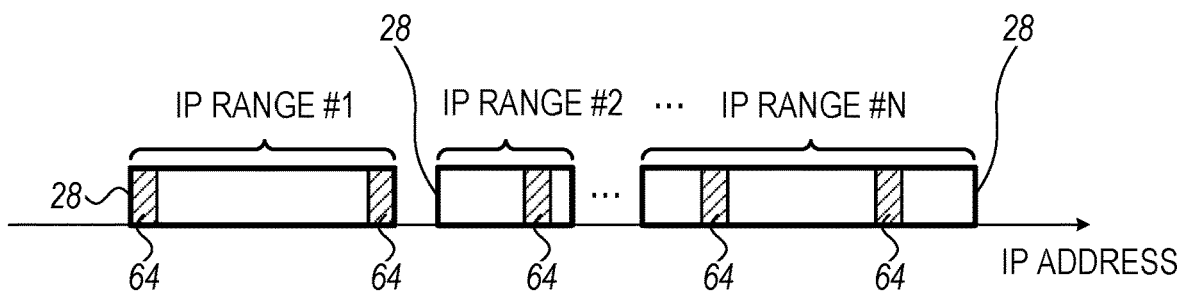
FIG. 2 is a diagram that schematically illustrates assignment of honeypot addresses in a secure cloud-provider system, in accordance with an embodiment of the present invention.

FIG. 2 is a diagram that schematically illustrates assignment of honeypot addresses 64 in secure cloud-provider system 20, in accordance with an embodiment of the present invention. In some embodiments, processor 60 of control server 52 assigns multiple IP addresses 64 for use by honeypots 40. These assigned IP addresses are referred to herein as "honeypot addresses."

The honeypot addresses are scattered across IP address ranges 28 that are allocated to the tenants. As can be seen in the example of FIG. 2, honeypot addresses may be positioned at the lower and/or upper edge of an IP address range 28, in the middle of an IP address range 28, distributed at random across an IP address range 28, or in any other suitable position. Generally, processor 60 may define any suitable number of honeypot addresses.

Typically, the honeypot addresses are omitted from the lists of IP addresses allocated to the tenants, so that legitimate tenant traffic will not be found on these addresses. In alternative embodiments, however, the honeypots are able to process traffic destined to IP addresses that are assigned to tenants, but on ports (TCP or UDP ports) that are known to be (i) not used by the tenants or (ii) blocked by a firewall, for example. Such traffic may be detected on-the-fly and diverted to the honeypots. Techniques of this sort are addressed, for example, in U.S. Pat. No. 9,491,189, entitled "Revival and redirection of blocked connections for intention inspection in computer networks," whose disclosure is incorporated herein by reference.

In some embodiments, processor 60 assigns the honeypot addresses to honeypots 40 using a suitable mapping. In accordance with this mapping, network traffic associated with a certain honeypot address will be directed to the corresponding honeypot. In an embodiment, multiple honeypot addresses may be associated with the same honeypot, and therefore the number of honeypot addresses may be considerably larger than the number of honeypot servers. The assignment of honeypot IP addresses to honeypot servers 40 may be configured, for example, using Network Address Translation (NAT). The assignment may be configured, for example, at gateways 32, and/or at the internal network interfaces (e.g., virtual NICs) and possibly hypervisors in case of a VM implementation.

Figure 3:
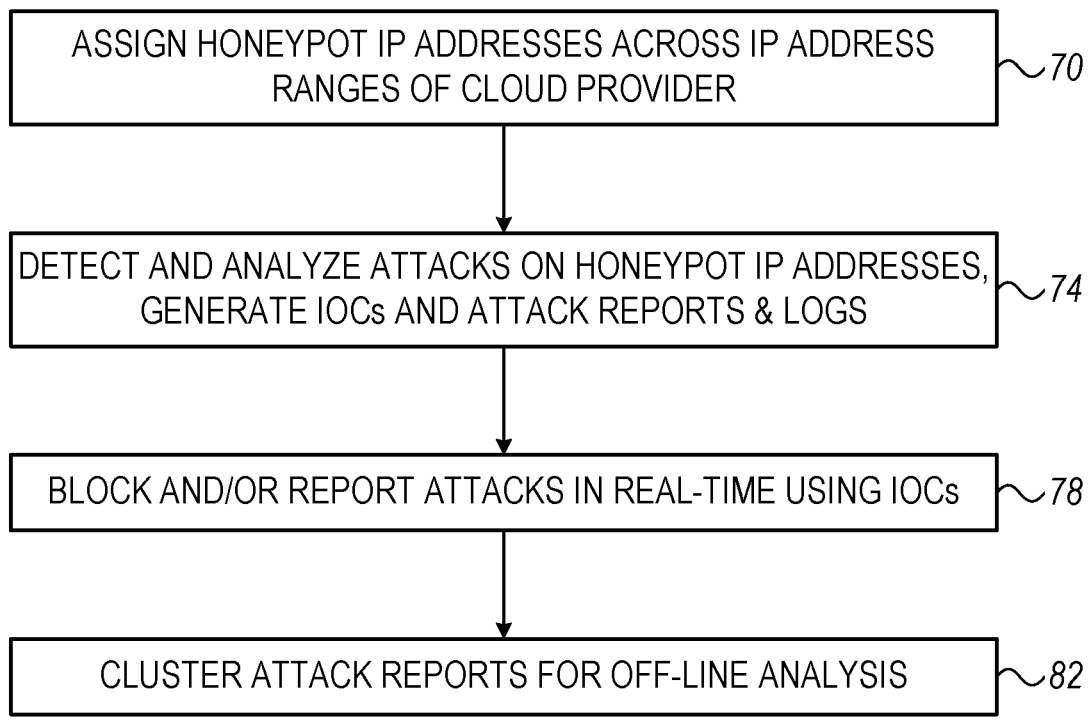
FIG. 3 is a flow chart that schematically illustrates a method for securing a cloud-provider system, in accordance with an embodiment of the present invention.

FIG. 3 is a flow chart that schematically illustrates a method for securing cloud-provider system 20, in accordance with an embodiment of the present invention. The method begins with processor 60 of control server 52 assigning honeypot addresses 64 scattered across IP address ranges 28, at an assignment step 70.

As explained above, processor 48 of each honeypot 40 monitors the network traffic associated with the honeypot addresses assigned thereto. At an attack detection step 74, processors 48 of honeypots 40 detect on the honeypot addresses traffic suspected of being part of hostile attacks.

Processors 48 may extract from the monitored attack traffic various attack parameters, referred to as Indicators of Compromise (IOCs). Non-limiting examples of IOCs may comprise network IOCs (e.g., attacker IP address and attacker domain name) and attack-related files carried by the attack traffic. In some embodiments, processors 48 also generate attack reports and logs that record the attacks they have detected and analyzed. Processors 48 of honeypots 40 send the IOCs, logs and reports over network 36 to processor 60 of control server 52.

In an embodiment, honeypots 40 may conform to multiple different operating systems and services, so as to be able to detect a wide variety of attacks. Honeypots 40 may track and log the actions carried out during attacks, as well as the sources of attacks (e.g., attacker IP addresses and/or domain names).

In an embodiment, honeypots 40 may distinguish between attack traffic and legitimate incoming requests associated with the honeypot addresses (e.g., requests from search-engine bots). To make such distinctions, the honeypots may be highly interactive, e.g., respond positively to queries and requests in order to gather as much information as possible regarding the intentions of the communicating entity. Examples of such honeypot features are addressed in U.S. patent application Ser. No. 15/492,009, entitled "Masquerading and monitoring of shared resources in computer networks," filed Apr. 20, 2017, which is assigned to the assignee of the present patent application and whose disclosure is incorporated herein by reference.

At a blocking & reporting step 78, processor 60 of control server 52 uses the IOCs extracted by honeypots 40 to block and/or report attacks in real-time. In an embodiment, processor 60 uses the IOCs to specify security rules and/or reporting rules. A typical blocking rule defines which network traffic should be blocked (e.g., because the traffic characteristics match the IOCs of a detected attack). A typical reporting rule defines which network traffic should be reported (e.g., because the traffic IOCs match the IOCs of a detected attack).

Note that the IOCs have been extracted from traffic associated with the honeypot addresses. The blocking and/or reporting rules, on the other hand, are applied to traffic associated with other IP addresses in ranges 29, which are assigned to the tenants. In an embodiment, processor 60 provides the blocking rules to security components of system 20 such as a firewall or IDS, which in turn match the traffic to and/or from servers 24 and attempt to identify attacks in the traffic.

In an embodiment, such a firewall or IDS detects attacks in the traffic related to the tenants by comparing network IOCs (e.g., attacker IP addresses and/or domain names) with the tenant traffic. In some network architectures, for example, the comparison may involve cross-referencing the network IOCs with NetFlow logs.

In an embodiment, the above technique can be complemented with detection of IOCs within the tenant applications on servers 24. This detection may be performed by security applications operated by the tenants, or by the cloud provider in case the latter has access to the tenant applications. IOCs that may be detected within the tenant applications may comprise, for example, files or registry entries characteristic of an attack.

In an example embodiment, processor 60 aggregates attack parameters (e.g., in IOC format) from the various honeypots 40 over short periods of time. The aggregated attack parameters can then be used to configure security rules in firewalls or other (hardware or software) security components deployed in system 20. These rules would block and/or alert subsequent attacks on servers 24. The blocking and alerting rules can also be applied to outgoing traffic, for example for intercepting traffic from an already compromised server to the attacker.

In some embodiments, system 20 may have multiple gateways 32 for connecting to the Internet. Each gateway may be protected by some security component, e.g., firewall, either internal to or external to servers 24. Any such security component may be configured with the blocking and/or alerting rules.

In an embodiment, the disclosed technique keeps the security components in system 20 configured to detect the most relevant threats in any given point of time. The relevance level of a threat may depend on various factors, such as time (e.g., currently ongoing attack attempts) and risk (the potential damage to servers 24). The disclosed technique therefore optimizes the configuration space of such security components, which is very limited and can typically hold parameters of only a fraction of all known threats.

At a clustering step 82, processor 60 clusters the (typically very large number of) attacks detected by honeypots 40 to a relatively small number of groups having similar characteristics. Since the number of attacks on system 20 at any given time is often very large, and since attacks on a specific IP address range at a specific geographical location in a specific time interval tend to be similar, clustering is highly effective.

Any suitable clustering scheme can be used in carrying out step 82. Some clustering schemes use machine-learning algorithms. Example clustering algorithms and attack features are described in U.S. Provisional Patent Application 62/339,896, cited above.

The clustering results can be used, for example, for understanding attack trends and researching attack features off-line. In an embodiment, attack trends can be correlated with IOCs detected in tenant applications, and in this manner rate the trends by their likelihood of occurrence and their current penetration level into the cloud-provider system.

In an embodiment, the clustering results can be used for reporting, e.g., reporting the number of new attacks per each group, or reporting the discovery of a new group. As yet another example, a human researcher may examine only a few attack logs from a group in order to understand the nature of all attacks in the group.

In an embodiment, the clustering process is incremental, with new attacks added to the previously aggregated clustering results without a need to process all attack events from scratch.

Typically, system 20 carries out the process of FIG. 3 continuously over time.

Although the embodiments described herein mainly address cloud-provider systems, the methods and systems described herein can also be used in other applications, such as in smaller size deployments, e.g., "De-Militarized Zones" (DMZs) of corporate networks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for securing a cloud-provider system, the apparatus comprising:
   one or more network interfaces for connecting to a network; and
   one or more processors, configured to allocate resources of the cloud-provider system for use by a plurality of tenants of the cloud-provider system, to allocate to each of the plurality of the tenants one or more Internet Protocol (IP) address ranges, to assign multiple IP addresses, scattered across the IP address ranges, for use by one or more honeypot servers, and to secure the cloud-provider system against hostile attacks, by processing network traffic associated with the assigned IP addresses using at least the one or more honeypot servers.

2. The apparatus according to claim 1, wherein each of the IP address ranges comprises a respective IP subnet and wherein the IP addresses assigned for use by one or more honeypot servers comprise at least one IP address in the same subnet as each of the allocated IP address ranges.

3. The apparatus according to claim 1, wherein the one or more processors are configured to secure the cloud-provider system without accessing the resources allocated to the tenants.

4. The apparatus according to claim 1, wherein the one or more processors are configured to:
   extract one or more attack parameters from the network traffic associated with the assigned IP addresses;
   specify a rule based on the extracted parameters; and
   apply the rule to other network traffic, which is associated with other IP addresses in the IP address ranges, different from the assigned IP addresses.

5. The apparatus according to claim 4, wherein the rule comprises a blocking rule specifying network traffic to be blocked, or a reporting rule specifying an attack to be reported.

6. The apparatus according to claim 1, wherein the one or more processors are configured to extract attack parameters from the network traffic associated with the assigned IP addresses, to cluster detected attacks to one or more groups, and to secure the cloud-provider system responsively to the groups.

7. The apparatus of claim 2, wherein the subnets including the IP address ranges include subnets of a plurality of different sizes.

8. The apparatus of claim 2, wherein the processor is configured to assign the IP addresses for use by one or more honeypot servers, at the lower edges of the IP address range in the same subnet.

9. The apparatus of claim 2, wherein the processor is configured to assign the IP addresses for use by one or more honeypot servers, at the upper edges of the IP address range in the same subnet.

10. The apparatus of claim 2, wherein the processor is configured to assign the IP addresses for use by one or more honeypot servers, in the middle of the IP address range in the same subnet.

11. A method for securing a cloud-provider system, the method comprising:
    allocating resources of the cloud-provider system for use by a plurality of tenants of the cloud-provider system, and further allocating to each of the plurality of the tenants one or more Internet Protocol (IP) address ranges;
    assigning multiple IP addresses, scattered across the IP address ranges, for use by one or more honeypot servers; and
    securing the cloud-provider system against hostile attacks, by processing network traffic associated with the assigned IP addresses using at least the one or more honeypot servers.

12. The method according to claim 11, wherein each of the IP address ranges comprises a respective IP subnet and wherein assigning the multiple IP addresses for use by the one or more honeypot servers comprises assigning at least one IP address in the same subnet as each of the allocated IP address ranges.

13. The method according to claim 11, wherein securing the cloud-provider system is performed without accessing the resources allocated to the tenants.

14. The method according to claim 11, wherein securing the cloud-provider system comprises:
    extracting one or more attack parameters from the network traffic associated with the assigned IP addresses;
    specifying a rule based on the extracted parameters; and applying the rule to other network traffic, which is associated with other IP addresses in the IP address ranges, different from the assigned IP addresses.

15. The method according to claim 14, wherein the rule comprises a blocking rule specifying network traffic to be blocked, or a reporting rule specifying an attack to be reported.

16. The method according to claim 11, wherein securing the cloud-provider system comprises extracting attack parameters from the network traffic associated with the assigned IP addresses, clustering detected attacks to one or more groups, and securing the cloud-provider system responsively to the groups.

* * * * *